United States Patent
Ketelsen et al.

(10) Patent No.: US 11,333,536 B2
(45) Date of Patent: May 17, 2022

(54) FLOW METER

(71) Applicant: SIKA Dr. Siebert & Kühn GmbH & Co. KG, Kaufungen (DE)

(72) Inventors: Jörn-Ove Ketelsen, Adelebsen (DE); Bastian Bleichert, Kaufungen (DE); Sergius Schmidt, Kassel (DE)

(73) Assignee: SIKA Dr. Siebert & Kühn GmbH & Co. KG, Kaufungen (DE)

( * ) Notice: Subject to any disclaimer, the term of this patent is extended or adjusted under 35 U.S.C. 154(b) by 136 days.

(21) Appl. No.: 16/505,160

(22) Filed: Jul. 8, 2019

(65) Prior Publication Data

US 2020/0018626 A1 Jan. 16, 2020

(30) Foreign Application Priority Data

Jul. 10, 2018 (DE) ................. 10 2018 116 640.0

(51) Int. Cl.
*G01F 1/32* (2022.01)
(52) U.S. Cl.
CPC .......... *G01F 1/3218* (2013.01); *G01F 1/3209* (2013.01)
(58) Field of Classification Search
CPC ......... G01F 1/32; G01F 1/3209; G01F 1/3218
See application file for complete search history.

(56) References Cited

U.S. PATENT DOCUMENTS

| 4,003,253 A | 1/1977 | Yard et al. | |
|---|---|---|---|
| 7,357,040 B2* | 4/2008 | Bell | G01F 1/40 73/861.52 |
| 7,895,902 B2* | 3/2011 | Iijima | G01F 1/58 73/861.11 |
| 2016/0084686 A1 | 3/2016 | Khalifa | |
| 2019/0226888 A1 | 7/2019 | Zander | |

FOREIGN PATENT DOCUMENTS

| DE | 2635801 A1 | 3/1977 |
| DE | 2802009 A1 | 7/1979 |
| DE | 102016108986 A1 | 11/2017 |
| EP | 1967827 A1 | 9/2008 |
| JP | 2011043366 A  * | 3/2011 |
| WO | 2008061551 A1 | 5/2008 |

\* cited by examiner

*Primary Examiner* — Erika J. Villaluna
(74) *Attorney, Agent, or Firm* — Dinsmore & Shohl LLP

(57) ABSTRACT

A flow meter for measuring the flow velocity of a fluid includes a measurement tube that is axially bounded by at least one flange end and that forms a measurement space that can be flowed through by the fluid. At least one baffle is provided for generating interference in the flow, wherein the baffle is arranged in the measurement space. A detector for detecting the interference is arranged downstream of the baffle. An insertion element is introduced into the measurement tube and has a base portion. The base portion is arranged in the flange end. The insertion element has brackets that adjoin the base portion and that project into the measurement space, with the baffle being formed and its position in the measurement space being held between the brackets.

14 Claims, 3 Drawing Sheets

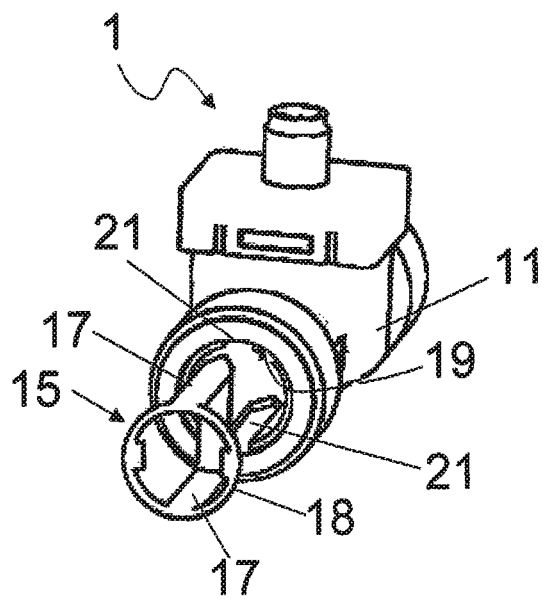
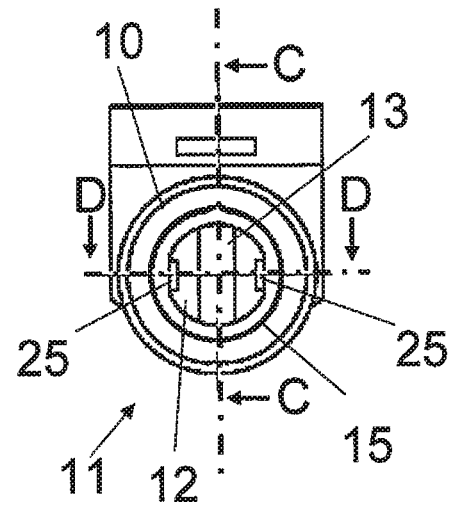
Fig. 6　　　　　　　　Fig. 7
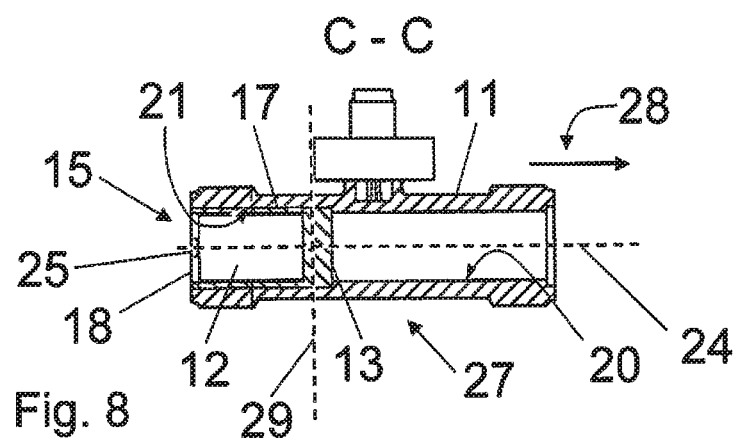
Fig. 8
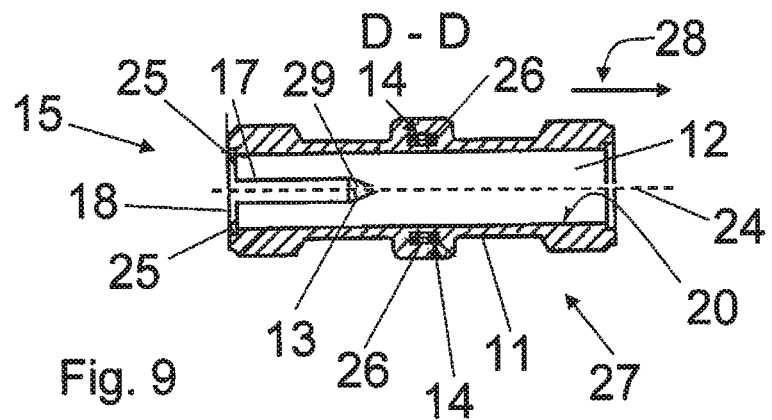
Fig. 9

FLOW METER

CROSS-REFERENCE TO RELATED APPLICATION

This application claims priority of German Patent Application DE 10 2018 116 640.0 filed Jul. 10, 2018, the entire content of which is incorporated herein by reference.

FIELD OF THE INVENTION

The invention relates to a flow meter for measuring the flow velocity of a fluid having a measurement tube that is axially bounded by at least one flange end and that forms a measurement space that can be flowed through by the fluid and having at least one baffle to generate interference in the flow, wherein the baffle is arranged in the measurement space and wherein a detector for detecting the interference is furthermore arranged downstream of the baffle.

BACKGROUND OF THE INVENTION

A flow meter is known from EP 1 967827 A1 for measuring the flow velocity of a fluid having a measurement tube and having an insertion tube that is inserted into the measurement tube and that forms a measurement space that can be flowed through by the fluid and having at least one baffle to generate interference in the flow, wherein the baffle is arranged in the insertion tube and wherein a detector for detecting the interference is furthermore arranged downstream of the baffle. The detector and the baffle are furthermore introduced through openings in the measurement tube and through openings in the insertion tube.

In this respect, the fluids flowing through the measurement tube can have a pressure of 80 bar and more applied to them. The structure of the insertion tube and in particular of the measurement tube is weakened by the openings. Cracks can in particular form and fluids can thus escape on an aging of the material. A further disadvantage comprises the measuring tube having a reduced inner diameter due to the inserted insertion tube, whereby pressure losses arise and the flow resistance increases.

A flow meter is known from the post-published DE 10 2018 101 278 A1 for measuring the flow velocity of a fluid having a measurement tube that forms a measurement space that can be flowed through by the fluid and having at least one baffle that is arranged in the measurement space, and wherein a measurement member is furthermore arranged as a detector downstream of the baffle in the measurement space, said measurement member being able deflected due to a vortex formation at the baffle, and wherein a shield element is provided that is arranged upstream in front of the measurement tube, and wherein the shield element has a passage corresponding to the diameter of the measurement space, and wherein at least one projection is formed at the shield element to amplify the vortices.

A disadvantage of this embodiment comprises the structure of the measurement tube likewise being weakened at points at which the baffle is formed at the measurement tube. A further disadvantage can be seen in the fact that the measurement tube is weakened at openings for receiving the detector and a leak through the openings can be formed.

SUMMARY OF THE INVENTION

The object of the invention is the improvement of a flow meter for measuring the flow velocity of a fluid that is suitable also to safely and reliably enable the flow velocity of fluids acted on by high pressure over a long period of use.

This object is achieved starting from a flow meter in accordance embodiments disclosed herein in conjunction with the characterizing features. Advantageous further developments of the invention are also set forth.

The invention includes the technical teaching that an insertion element introduced into the measurement tube is provided with a base portion, wherein the base portion is arranged in the flange end and wherein the insertion element has brackets that adjoin the base portion and that project into the measurement space, and wherein the baffle is formed and is held in its position in the measurement space between the brackets of the baffle.

The essence of the invention is to provide a measurement tube by the insertion element with a baffle that can in particular also be operated without weak points at high pressures, at high temperatures, or with temperature fluctuations. Since the measurement tube and the baffle are not formed in one piece, structural weak points remain at connection points and at their transitions between the measurement tube and the baffle. Different sizes, in particular different bracket lengths, can be utilized and simply replaced by the use of the insertion element. Optimum interference for measuring the flow velocity can thereby be generated in the fluid flow for fluids having respectively different properties, in particular different viscosities. A further advantage can be seen in that flow losses can be kept small since an insertion element does not take up any construction space, or only a little construction space, in the measurement tube.

In an advantageous embodiment, the base portion of the insertion element is configured as an annular member that is arranged in an annular groove introduced into the flange end. A secure seat and a predefined orientation and positioning of the insertion element in the measurement space is thereby made possible. A flush transition between a surface of the flange end at an end face and a surface of the annular member at an end face is formed by the introduction of the annular member into the annular groove. This flush transition is advantageous when the pipe is screwed by means of a connection screw point to a thread at the flange end. A leak tight connection is thereby formed and the insertion element is held in a provided position. An insertion element having an annular member can furthermore be replaced particularly simply since it can be simply reached and gripped at the flange end.

To amplify interference in the flow, in particular a formation of turbulence or of vortices, at least one radially inwardly protruding projection can be formed at the base portion of the insertion element upstream of the baffle. It has been found to be particularly advantageous here that a respective projection is arranged at diametrically opposed positions of the base portion. A turbulence amplification is thereby effected that can also be used a low flow velocities of the fluid in the measurement tube. It can be assumed as the cause for this effect that the arrangement of at least one projection upstream of the baffle generates turbulence at the projection and the turbulence generated at the projection is shed from the projection and can amplify the vortices of a forming Kármán vortex street that are generated at the baffle. As a result, a greater action on the detector is produced, in particular by the amplified vortices periodically shedding at the baffle. An additional means holding the projection becomes superfluous due to the arrangement of the projection at the base portion. Furthermore, a laborious positioning of the projection becomes superfluous since the positioning takes place on the insertion of the insertion element.

The insertion element is advantageously an injection molded component composed of a plastic or a die cast component composed of a metallic material, in particular brass. The base portion, the brackets and the baffle are here configured as a single-part component. The manufacture, an assembly, and a replacement of the insertion element in the measurement tube are simplified by the single-part design. Furthermore, an incorrect arrangement or deviations due to tolerances between these components is/are avoided by single-part and thus fixedly predefined arrangement of the base portion, the brackets, and the baffle with respect to one another. Insertion elements having differently dimensioned components, that is brackets, annular body, baffle, and projection can be kept in stock in dependence on the properties of the fluid such as viscosity and on the flow velocity and can then be inserted into the measurement tube as replacements for one another in accordance with the properties.

In an advantageous further development, an inner wall of the measurement tube has at least one and/or two oppositely disposed longitudinal groove(s) in which the brackets lie when the insertion element is introduced into the measurement tube. The longitudinal grooves here are formed as complementary to the cross-section of the brackets so that the inner wall is formed without interruption with brackets introduced into the longitudinal grooves. An insertion, as well as a positioning and an orientation, of the insertion element in the measurement tube is facilitated by the longitudinal grooves and the brackets and an incorrect positioning is avoided. Due to the interruption-free configuration of the inner wall, an interference-free flow of the fluid is made possible and a pressure loss is thus avoided.

In an advantageous further development of the flow meter, the base portion is formed with at least one molding and provision is made that the flange end of the measurement tube is formed with a cutout complementary to the molding so that the insertion element is rotationally oriented about a longitudinal axis of the measurement tube when the molding engages into the cutout. It can in particular be ensured by the orientation that the position of the projection and of the baffle relative to a detector enables a particularly good detection of interference in the flow so that in particular low flow velocities can also be detected.

To ensure a high structural stiffness without any weakening of the structure and an improved injection molding capability of the flow meter, in particular of the measurement tube, the inner wall of the measurement tube is continuously closed and/or the detector is integrated in the wall of the measurement tube or is arranged at the outer side thereat. Weak points at openings at which cracks can form or fluid could escape are therefore not present. The flow of the fluid is furthermore not additionally impaired by the arrangement of the detector outside the measurement space.

The detector is advantageously configured as at least one piezo element and is arranged at an outer side of the measurement tube. In a particularly advantageous further development, two piezo elements are arranged at opposite sides at the periphery of the measurement tube. An inexpensive, reliable means is provided for a contactless detection of the interference in the flow and for a determination of the flow velocity by the use of piezo elements. An arrangement of a respective one piezo element at oppositely disposed sides of the measurement tube at the same spacing from the baffle in particular enables a reliable detection of turbulence or interference in the flow. In particular when the turbulence or interference in the flow occur, viewed along the longitudinal axis, alternately on different sides of the baffle, in particular in the form of vortices.

The baffle particularly advantageously extends transversely to a longitudinal axis of the measurement space, for example in a vertical axis through it, wherein the at least one projection at the base portion of the insertion element is arranged at a position at the inner wall that is rotated about the longitudinal axis with respect to the vertical axis. The rotation can, for example, amount to 60° to 90°, preferably 80° to 90°, and particularly preferably 90°, so that the projection is particularly preferably arranged directly transversely to the vertical axis and thus also transversely to the arrangement of the brackets at the base portion.

BRIEF DESCRIPTION OF THE DRAWING

Further measures improving the invention will be shown in more detail in the following together with the description of a preferred embodiment of the invention with reference to the Figures. There are shown:

FIG. 6 is a perspective view of a further embodiment of the insertion element in an arrangement in front of the measurement tube with a longitudinal groove in an inner wall of the measurement tube;

FIG. 7 is a front view of the measurement tube in accordance with the further embodiment with an inserted insertion element;

FIG. 8 is a cross-sectional side view of the measurement tube with an inserted insertion element along the line C-C in accordance with FIG. 7; and FIG. 9 is a cross-sectional side view of the measurement tube with an inserted insertion element along the line D-D of the further embodiment in accordance with FIG. 7.

DETAILED DESCRIPTION OF THE PREFERRED EMBODIMENTS

Figures 1, 2:
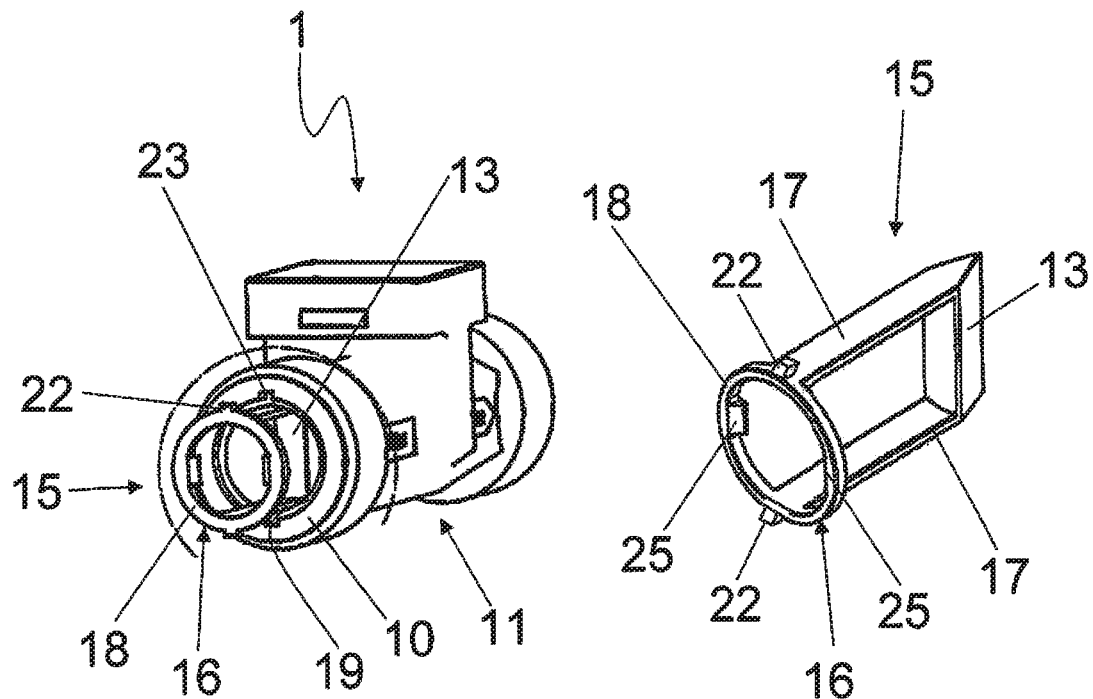
FIG. 1 is a perspective view showing a measurement tube with an insertion element with reference to a first embodiment.
FIG. 2 is a perspective view showing the insertion element in accordance with embodiment.

FIG. 1 shows in a perspective representation a flow meter 1 having a flange end 10 formed at a measurement tube 11. An insertion element 15 is partially inserted into the measurement tube 11 at the flange end side. The insertion element 15 comprises a base portion 16 formed as an annular member 18 and having two moldings 22 and also comprises a baffle 13. The baffle 13 is here located in the measurement tube 11. An annular groove 19 for receiving the annular member 18 and cutouts 23 for receiving the complementary moldings 22 are arranged at the flange end 10.

The insertion element 15 is shown in FIG. 2 comprising the base portion 16 configured as the annular member 18 and having brackets 17 arranged thereat between which the baffle 13 is formed. Projections 25 are radially inwardly formed at diametrically opposed sides at the annular body.

Radially outwardly projecting moldings 22 are furthermore formed at the annular member 18.

Figure 3:
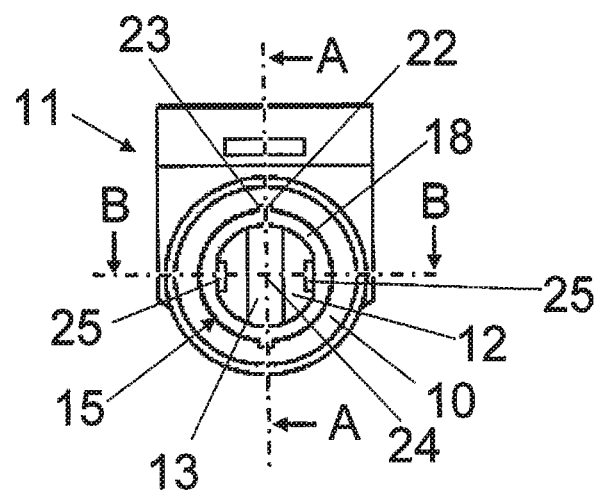
FIG. 3 is a front view of the measurement tube in accordance with the first embodiment with an inserted insertion element.

The measurement tube 11 is shown with a completely inserted insertion element 15 in a plan view of the flange end 10 in FIG. 3. The molding 22 is here seated in the cutout 23 of the flange end 10. The projections 25 arranged at the annular member 18 project into a measurement space 12 in which the baffle 13 is also arranged.

Figure 4:
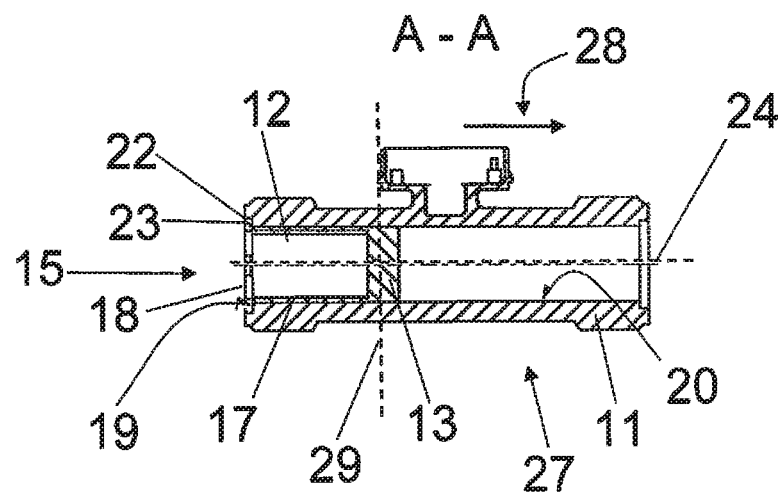
FIG. 4 is a cross-sectional side view of the measurement tube with an inserted insertion element along the line A-A in accordance with FIG. 3.
Figure 5:
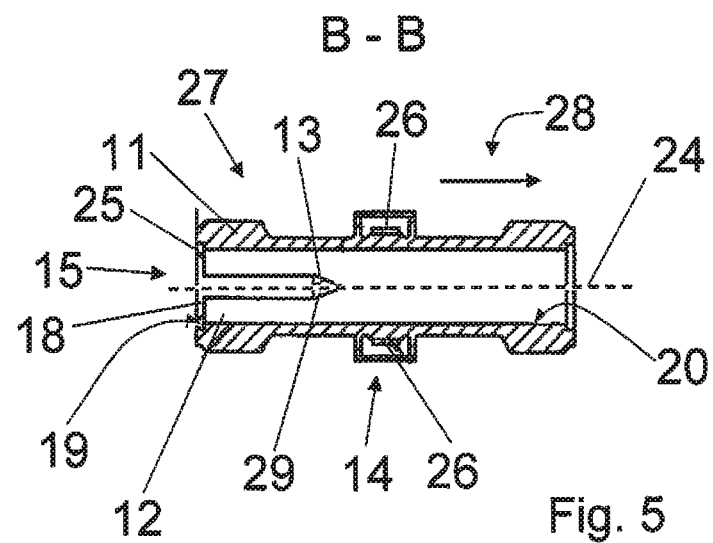
FIG. 5 is a further cross-sectional side view of the measurement tube with an inserted insertion element along the line B-B in accordance with FIG. 3.

FIGS. 4 and 5 show in a cross-sectional side view along lines A-A or B-B in accordance with FIG. 3, the measurement tube 11 with an insertion element 15 completely inserted into it and two detectors 14 that are configured as piezo elements 26 and that are, for example, adhesively bonded to an outer wall at an outer side 27 of the measurement tube 11. An interference-free transfer of the interference in the fluid flow to the piezo element 26 in the form of ultrasound waves or ultrasound pulses is promoted by the adhesive bonding, with, for example, an opening also being able to be provided in the reception volume of the piezo elements 26. An orientation of the insertion element 15 with the baffle 13 about a rotational longitudinal axis 24 is achieved by the molding 22 and the cutout 23 in accordance with FIGS. 3 and 4. The projection 25 and the baffle 13 are here arranged about the longitudinal axis 24 respectively offset by 90°. Since the turbulence produced by the baffle 13 occurs close to the piezo element 26 in this arrangement, the turbulence can be detected particularly well and an exact measurement of the flow velocity of the fluid is possible. In this embodiment with the molding 22 and the cutout 23, an inner wall 20 bounding the measurement space 12 is continuously closed and planar without interruption, whereby a high stability of the measurement tube is provided. These properties are in particular important in the measurement of fluid flows at a high pressure of 80 bar and more. The annular member 18 is seated in the annular groove 19 at the flange end 10 of the measurement tube 11 in the inserted state, whereby the flange end 10 and the annular member 18 form a planar plane at the end face. The bracket 17 is disposed adjacent to the inner wall 20 of the measurement tube 11 and projects into the measurement space 12.

FIG. 6 shows the flow meter 1 in a further embodiment having longitudinal grooves 21 formed in the measurement tube 11 for receiving the brackets 17 of the insertion element 15. The longitudinal grooves 21 serve the reception and guidance of the brackets 17 on the insertion into the measurement tube 11. The annular groove 19 for receiving the annular member 18 is likewise shown.

FIG. 7 shows the measurement tube 11 having a completely inserted insertion element 15. The projection 25 here projects into the measurement space 12 and the baffle 13 is arranged in the measurement space 12. A vertical axis 29 in accordance with FIGS. 8 and 9 extends in parallel with the line C-C.

FIGS. 8 and 9 show a section of the measurement tube 11 in accordance with FIG. 7 along the lines C-C and D-D with a completely inserted insertion element 15 in the measurement tube 11. The bracket 17 here lies flush in the longitudinal groove 21. Vibrations of the bracket 17 or of the baffle 13 when fluid flows through are avoided by this flush shape matching. The inner wall 20 of the measurement tube 11 and an inner surface of the bracket 17 terminate flush with one another by the longitudinal groove 19 and form the measurement space 12. Two detectors 14 in the form of piezo elements 26 are arranged diametrically opposed on the outer side 27 of the measurement tube 11, with an oil/conductive grease or another suitable material, an adhesive, for example, being applied between the measurement tube 11 and the piezo elements 26 to ensure a transfer in an improved manner of ultrasound waves into and out of the fluid onto the piezo elements 26. The piezo elements 26 are connected to signal cables via a plug-in connection or a solder connection via which a measured signal is forwarded from the piezo elements to an evaluation unit to evaluate and determine the flow velocity of the fluid.

The flowing through of the measurement space 12 takes place in a flow direction 28 indicated by an arrow and two piezo elements 26 are located downstream of the baffle 13. Periodic interference in the form of turbulence or shedding vortices is formed at said baffle 13 due to the flow onto the baffle 13. Sound waves are produced in this process. Two projections 25 are located upstream in front of the baffle 13 at the inner wall 20 of the measurement space 12 in a lateral arrangement with respect to the baffle 13. The projections 25 are molded to the annular member 18 in an arrangement disposed opposite one another, with the diametrical direction of the arrangement of the projections 25 being rotated by 90° with respect to the vertical axis 29 in accordance with the embodiment shown, along which vertical axis 29 the baffle 13 extends. The diametrically opposed piezo elements 26 are rotated by 90° with respect to the vertical axis 29 at the outer side 27 of the measurement tube 11.

If a throughflow of the measurement space 12 takes place, turbulence is formed at or directly behind the projections 25 that influences the turbulence at the baffle 13 and/or that can, for example, combine with vortices at the baffle 13 and can thus increase their size. An amplification of the turbulence at the baffle 13 thereby results, whereby the sound waves are also amplified. Flows at very low flow velocities of the fluid through the measurement tube 11 can thereby also be measured in an improved manner by the piezo elements 26.

The performance of the invention is not restricted to the preferred embodiment specified above. A plurality of variants are rather conceivable that also make use of the solutions shown with generally differently configured embodiments. All the features and/or advantages that can be seen from the claims, the description, or the drawings, including design details or spatial arrangements, can be material to the invention both per se and in the most varied combinations.

REFERENCE NUMERAL LIST 1 flow meter
10 flange end
11 measurement tube
12 measurement space
13 baffle
14 detector
15 insertion element
16 base portion
17 bracket
18 annular member
19 annular groove
20 inner wall
21 longitudinal groove
22 molding
23 cutout
24 longitudinal axis
25 projection
26 piezo element
27 outer side
28 direction of flow
12 vertical axis

The invention claimed is:

1. A flow meter for measuring a flow velocity of a fluid, comprising:
   a measurement tube that is axially bounded by at least one flange end and that forms a measurement space that can be flowed through by the fluid;
   an insertion element received in the measurement tube, the insertion element including a base portion, the base portion being arranged in the flange end of the measurement tube, the insertion element further having brackets that adjoin the base portion and that project into the measurement space of the measurement tube, a baffle formed between the brackets, the baffle being disposed in the measurement space in a position between the brackets, the baffle generating interference in the flow; and
   a detector for detecting the interference in the flow being arranged downstream of the baffle;
   wherein the base portion, the brackets, and the baffle are formed together as a single-part component.

2. The flow meter in accordance with claim 1, wherein:
   the flange end of the measurement tube has an annular groove; and
   the base portion of the insertion element forms an annular body that is arranged in the annular groove of the flange end.

3. The flow meter in accordance with claim 1, wherein an inner wall of the measurement tube has two oppositely disposed longitudinal grooves in which the brackets lie when the insertion element is introduced into the measurement tube.

4. The flow meter in accordance with claim 3, wherein the longitudinal grooves are formed as complementary to a cross-section of the brackets so that the inner wall is formed without interruption with the brackets in the longitudinal grooves.

5. The flow meter in accordance with claim 1, wherein:
   the base portion of the insertion element is formed with at least one molding;
   the flange end of the measurement tube is formed with a cutout complementary to the molding so that the insertion element is rotationally oriented about a longitudinal axis of the measurement tube when the molding engages into the cutout.

6. The flow meter in accordance with claim 1, wherein an inner wall of the measurement tube is continuously closed.

7. The flow meter in accordance with claim 6, wherein the detector is integrated in the inner wall of the measurement tube.

8. The flow meter in accordance with claim 6, wherein the detector is arranged at an outer side of the inner wall.

9. The flow meter in accordance with claim 1, wherein the base portion of the insertion element includes at least one radially inwardly protruding projection disposed upstream of the baffle.

10. The flow meter in accordance with claim 9, wherein the at least one radially inwardly protruding projection comprises two projections arranged at diametrically opposed positions of the base portion.

11. The flow meter in accordance with claim 1, wherein the insertion element is an injection molding component composed of a plastic or a die cast component composed of a metallic material.

12. The flow meter in accordance with claim 1, wherein the detector comprises at least one piezo element arranged at an outer side of the measurement tube.

13. The flow meter in accordance with claim 12, wherein the at least one piezo element comprises two piezo elements arranged at oppositely disposed sides at a periphery of the measurement tube.

14. The flow meter in accordance with claim 1, wherein the measurement tube has an internal wall surface in contact with the fluid.

* * * * *